United States Patent
Mottley et al.

(10) Patent No.: US 12,547,399 B2
(45) Date of Patent: Feb. 10, 2026

(54) INTELLIGENT FILE STASHING AND UNSTASHING

(71) Applicant: Capital One Services, LLC, McLean, VA (US)

(72) Inventors: Clayton Mottley, Alexandria, VA (US); Phoebe Warren, Richmond, VA (US); Elijah Sattler, Richmond, VA (US); Lauren Toth, Washington, DC (US); Robert Wright, Henrico, VA (US); Torrance Graham, York, PA (US); Dominique Edwards, Charlotte, NC (US); Bal Reddy Cherlapally, Glen Allen, VA (US)

(73) Assignee: Capital One Services, LLC, McLean, VA (US)

( * ) Notice: Subject to any disclaimer, the term of this patent is extended or adjusted under 35 U.S.C. 154(b) by 226 days.

(21) Appl. No.: 18/403,394

(22) Filed: Jan. 3, 2024

(65) Prior Publication Data

US 2025/0217139 A1   Jul. 3, 2025

(51) Int. Cl.
*G06F 8/77* (2018.01)
*G06F 16/176* (2019.01)

(52) U.S. Cl.
CPC .............. *G06F 8/77* (2013.01); *G06F 16/176* (2019.01)

(58) Field of Classification Search
CPC ................................ G06F 8/77; G06F 16/176
See application file for complete search history.

(56) References Cited

U.S. PATENT DOCUMENTS

| | | | | |
|---|---|---|---|---|
| 6,178,429 B1 * | 1/2001 | Cherf | .................. | G06F 16/1774 707/999.009 |
| 7,370,025 B1 | 5/2008 | Pandit | | |
| 8,332,470 B2 * | 12/2012 | Arun | ...................... | G06Q 10/10 709/204 |
| 8,370,294 B2 * | 2/2013 | Lyakhovitskiy | ........ | G06F 16/10 707/661 |
| 9,507,798 B1 * | 11/2016 | Zhao | ................... | G06F 16/1734 |
| 10,417,179 B2 * | 9/2019 | Lee | ......................... | G06F 16/166 |
| 11,086,545 B1 * | 8/2021 | Dayal | ..................... | G06F 3/067 |

(Continued)

OTHER PUBLICATIONS

Barney, N., "What is the Git Stash Command? | Definition from TechTarget",, Jun. 1, 2023, pp. 1-7, XP093258243, Retrieved from the Internet: URL:https://www.theserverside.com/definition/git-stash.

(Continued)

*Primary Examiner* — Douglas M Slachta
(74) *Attorney, Agent, or Firm* — Harrity & Harrity, LLP (57) ABSTRACT

In some implementations, a controller may receive a first unstash command, associated with a first node and a first workspace, to unstash a first set of files. The controller may perform an unstash operation for the first set of files, in response to the first unstash command, based on a first stash variable lacking an indicator associated with the first set of files and a global stash variable including the indicator associated with the first set of files. The controller may receive a second unstash command, associated with a second node and a second workspace, to unstash a second set of files. The controller may refrain from performing an unstash operation based on a second stash variable including an indicator associated with the second set of files.

20 Claims, 8 Drawing Sheets

(56) References Cited

U.S. PATENT DOCUMENTS

| | | | | |
|---|---|---|---|---|
| 12,169,802 | B1* | 12/2024 | Eldan .................... | G06F 40/186 |
| 2002/0035618 | A1* | 3/2002 | Mendez .................. | H04L 63/10 |
| | | | | 709/200 |
| 2011/0225451 | A1* | 9/2011 | Leggette ................. | H04L 63/10 |
| | | | | 714/E11.088 |
| 2014/0089256 | A1* | 3/2014 | Mardugalliamov .... | G06F 16/23 |
| | | | | 707/609 |
| 2020/0193469 | A1* | 6/2020 | Mcguire ............ | G06Q 30/0226 |
| 2022/0326943 | A1* | 10/2022 | Iwamura ................... | G06F 8/72 |

OTHER PUBLICATIONS

Extended European Search Report for European Application No. EP242108348 dated Mar. 24, 2025, 9 pages.
Rafael Alonso Daniel Barbara, et al., "Using Stashing to Increase Node Autonomy in Distributed File Systems," IEEE (1990), pp. 12-21.
Jenkins, "Pipeline: Basic Steps," retrieved from https://www.jenkins.io/doc/pipeline/steps/workflow-basic-steps/#stash-stash-some-files-to-be-used-later-in-the-build on Oct. 2, 2023, 11 pages.

* cited by examiner

INTELLIGENT FILE STASHING AND UNSTASHING

BACKGROUND

In a software development pipeline, a remote environment (such as a cloud environment) may include multiple nodes for editing and compiling code for an application (or another type of project). Each node may also include multiple workspaces.

SUMMARY

Some implementations described herein relate to a system for intelligent file stashing and unstashing. The system may include one or more memories and one or more processors communicatively coupled to the one or more memories. The one or more processors may be configured to receive a stash command, associated with a first node and a first workspace, to stash a first set of files. The one or more processors may be configured to perform a stash operation for the first set of files, in response to the stash command, to generate a first stash indicator. The one or more processors may be configured to update a global stash variable with the first stash indicator. The one or more processors may be configured to update a first stash variable, associated with the first node, with the first stash indicator and an indicator of the first workspace. The one or more processors may be configured to receive an unstash command, associated with the first node and the first workspace, to unstash the first set of files. The one or more processors may be configured to refrain from performing an unstash operation based on the first stash variable including the first stash indicator and the indicator of the first workspace.

Some implementations described herein relate to a method of intelligent file unstashing. The method may include receiving, at a controller, a first unstash command, associated with a first node and a first workspace, to unstash a first set of files. The method may include performing, by the controller, an unstash operation for the first set of files, in response to the first unstash command, based on a first stash variable lacking an indicator associated with the first set of files and a global stash variable including the indicator associated with the first set of files. The method may include receiving, at the controller, a second unstash command, associated with a second node and a second workspace, to unstash a second set of files. The method may include refraining from performing, by the controller, an unstash operation based on a second stash variable including an indicator associated with the second set of files.

Some implementations described herein relate to a non-transitory computer-readable medium that stores a set of instructions for intelligent file stashing. The set of instructions, when executed by one or more processors of a device, may cause the device to receive a first stash command, associated with a first node and a first workspace, to stash a first set of files. The set of instructions, when executed by one or more processors of the device, may cause the device to perform a stash operation for the first set of files, in response to the first stash command, to generate a first stash indicator. The set of instructions, when executed by one or more processors of the device, may cause the device to update a global stash variable with the first stash indicator. The set of instructions, when executed by one or more processors of the device, may cause the device to update a first stash variable, associated with the first node, with the first stash indicator and an indicator of the first workspace. The set of instructions, when executed by one or more processors of the device, may cause the device to receive a second stash command, associated with a second node and a second workspace, to stash a second set of files. The set of instructions, when executed by one or more processors of the device, may cause the device to perform a stash operation for the second set of files, in response to the second stash command, to generate a second stash indicator. The set of instructions, when executed by one or more processors of the device, may cause the device to update the global stash variable with the second stash indicator. The set of instructions, when executed by one or more processors of the device, may cause the device to update a second stash variable, associated with the second node, with the second stash indicator and an indicator of the second workspace.

DETAILED DESCRIPTION

The following detailed description of example implementations refers to the accompanying drawings. The same reference numbers in different drawings may identify the same or similar elements.

In a software development pipeline, a remote environment (e.g., a Jenkins® environment) may include multiple nodes for editing and compiling code for an application (or another type of project). Each node may also include multiple workspaces. For example, a Jenkins node may include a main workspace and may optionally include one or more additional workspaces (e.g., for temporary storage). In order to share files across workspaces and nodes, the remote environment may provide functions to stash files (e.g., for sharing) and unstash files (e.g., that were previously stashed). As used herein, "stash" refers to compressing and storing a set of files for use across multiple nodes but limited to a particular project (e.g., stashes are not accessible across different pipeline runs and/or expire after an amount of time).

However, when scripts are executed in the remote environment across multiple nodes, sometimes an unstash command is executed for a set of files even though the set of files are already present on a node (and/or in a workspace). Accordingly, processing resources and power are wasted.

Some implementations described herein enable global variables that track stashed files. Therefore, the global variables may be used to verify whether unstash commands are associated with files that are already present on a relevant node and/or workspace. As a result, processing resources and power are conserved that otherwise would have been wasted on executing redundant unstash commands.

FIGS. 1A-1E are diagrams of an example 100 associated with intelligent file stashing and unstashing. As shown in FIGS. 1A-1E, example 100 includes a controller, a pipeline engine, a user device, and a script executor. These devices are described in more detail in connection with FIGS. 3 and 4.

Figure 1A:
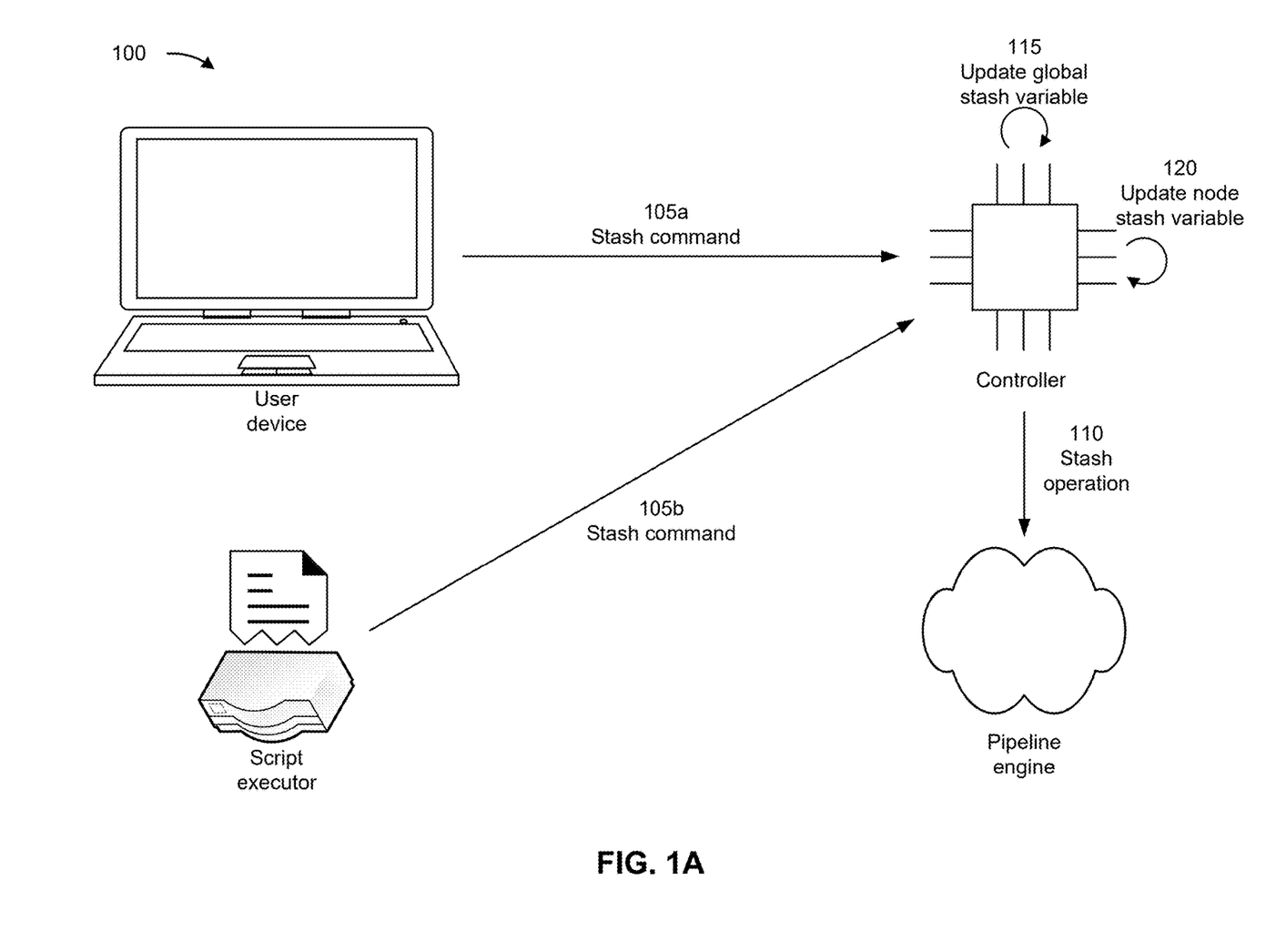
FIGS. 1A-1E are diagrams of an example implementation relating to intelligent file stashing and unstashing, in accordance with some embodiments of the present disclosure.

As shown in FIG. 1A, the controller may receive a stash command. For example, as shown by reference number 105a, the user device may transmit, and the controller may receive, the stash command. The user device may transmit the command by transmitting a hypertext transmit protocol (HTTP) request and/or by performing a call to an application programing interface (API) function, among other examples. In some implementations, a user of the user device may provide input (e.g., using an input component of the user device) that triggers the user device to transmit the command. In another example, as shown by reference number 105b, the script executor may transmit, and the controller may receive, the stash command. The script executor may perform operations according to a script (e.g., a set of Bourne Again Shell (BASH) instructions, a set of Python instructions, and/or another set of sequential instructions) and may transmit the stash command based on a current instruction in the script.

The stash command may be associated with a first node and a first workspace and may be a command to stash a first set of files. For example, the stash command may indicate the first node and the first workspace (e.g., in parameters encoded in a header and/or a body of the request and/or as arguments to an API call). The first node may include a first set of workspaces, and thus the stash command may indicate the first workspace out of the first set of workspaces. Additionally, the stash command may indicate the first set of files (e.g., using one or more filenames and/or a folder name relative to a home location, such as the first workspace).

As shown by reference number 110, the controller may perform a stash operation (e.g., on the pipeline engine) for the first set of files. The controller may perform the stash operation in response to the stash command (e.g., from the user device or the script executor). Performing the stash operation may result in a first stash indicator. For example, the first stash indicator may be an alphanumeric identifier associated with a stash that includes the first set of files.

As shown by reference number 115, the controller may update a global stash variable with the first stash indicator. For example, the global stash variable may include a variable maintained by the controller across a set of nodes (that includes the first node). The global stash variable may thus be associated with a pipeline (e.g., for software development and provided by the pipeline engine) that includes the first node.

In some implementations, the controller may append, to the global stash variable, an object having a name corresponding to the first stash indicator. For example, the controller may append an object titled binaries in response to stashing a set of files included in a folder named "binaries." In another example, the controller may append an object titled sources in response to stashing a set of files included in a folder named "sources." Therefore, the object may represent the first set of files. The controller may further store a list of the first set of files in the object. For example, the controller may generate an array (or another type of list) named files in the object and include a set of strings storing a set of filenames (and/or a set of file paths) corresponding to the first set of files. Therefore, the object may encode a list of the first set of files. In some implementations, the controller may further store a property (e.g., at least one property), associated with the first set of files, in the object.

For example, the controller may generate a variable named checksum that stores a checksum associated with the first set of files.

In addition to updating the global stash variable, the controller may update a first stash variable, associated with the first node, with the first stash indicator, as shown by reference number 120. In some implementations, the controller may store a name, corresponding to the first stash indicator, in an object representing the first node. For example, the object may be named j2x-regular-us-east-1-stable in order to represent the first node with the name "j2x-regular-us-east-1-stable," and the controller may add a string representing a name of a stash including the first set of files to a stashes array (or another type of list) in the object. In some implementations, the controller may additionally update the first stash variable with an indicator of the first workspace. Accordingly, the controller may store a name of the first workspace in the object representing the first node. For example, the controller may add a string representing a name of the first workspace to a workspaces array (or another type of list) in the object. Other examples may include a single workspace per node such that the name of the first workplace is stored in a workplace string variable rather than a workspaces array.

The operations described in connection with FIG. 1A may be repeated. For example, the controller may receive an additional stash command, associated with a second node and a second workspace, to stash a second set of files. Accordingly, the controller may perform a stash operation for the second set of files, in response to the additional stash command. Performing the stash operation for the second set of files may generate a second stash indicator. The controller may update the global stash variable with the second stash indicator and may update a second stash variable, associated with the second node, with the second stash indicator and an indicator of the second workspace.

Figure 1B:
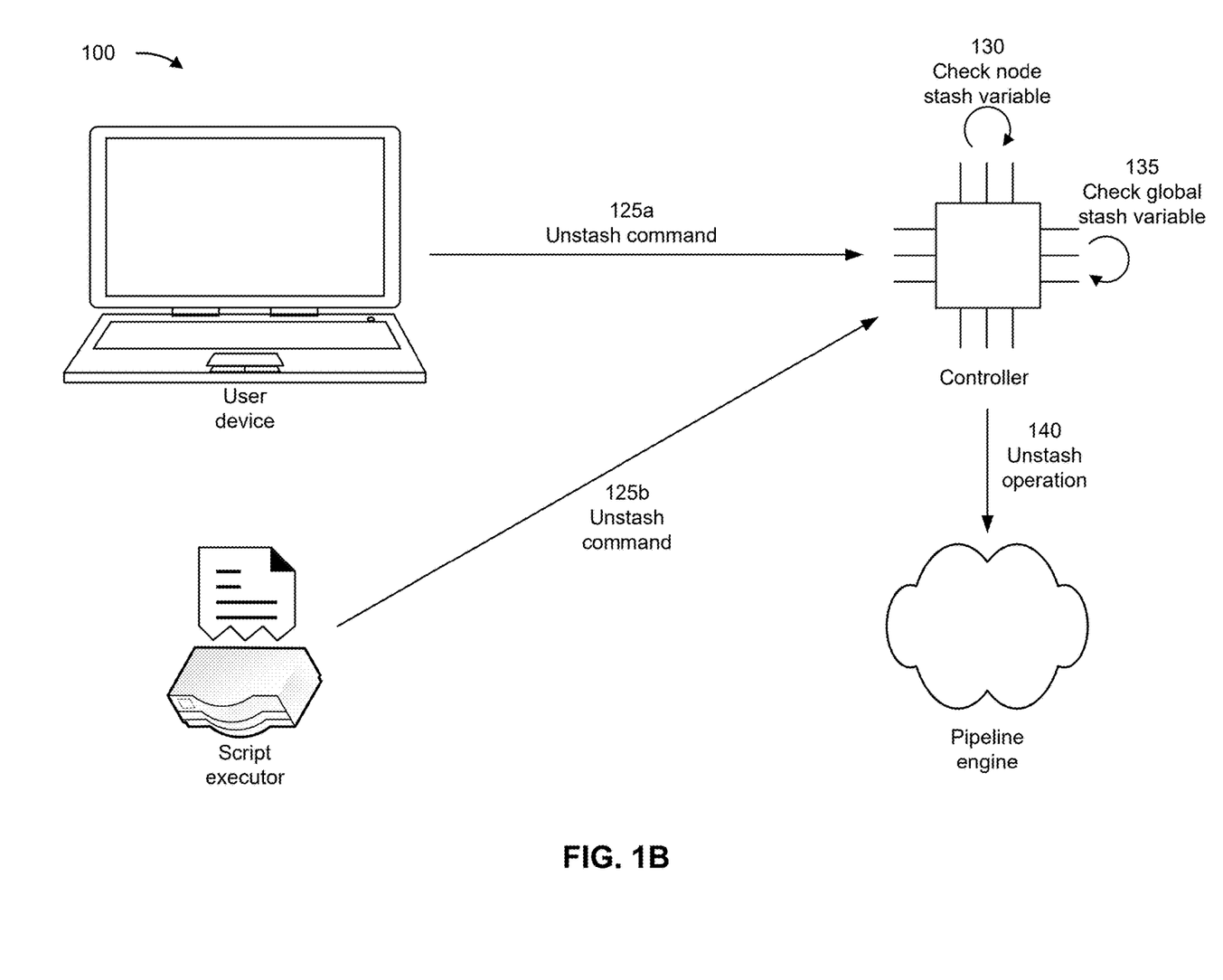

As shown in FIG. 1B, the controller may receive an unstash command. For example, as shown by reference number 125a, the user device may transmit, and the controller may receive, the unstash command. The user device may transmit the command by transmitting an HTTP request and/or by performing a call to an API function, among other examples. In some implementations, a user of the user device may provide input (e.g., using an input component of the user device) that triggers the user device to transmit the command. In another example, as shown by reference number 125b, the script executor may transmit, and the controller may receive, the unstash command. The script executor may perform operations according to a script (e.g., a set of BASH instructions, a set of Python instructions, and/or another set of sequential instructions) and may transmit the unstash command based on a current instruction in the script.

The unstash command may be associated with the first node and the first workspace and may be a command to unstash the first set of files. For example, the unstash command may indicate the first node and the first workspace (e.g., in parameters encoded in a header and/or a body of the request and/or as arguments to an API call). Additionally, the unstash command may indicate the stash including the first set of files (e.g., using a name associated with the stash).

As shown by reference number 130, the controller may check the first stash variable to determine whether to perform an unstash operation. For example, based on the first stash variable including the first stash indicator and the indicator of the first workspace, the controller may refrain from performing the unstash operation. As a result, the controller conserves power and processing resources that otherwise would have been spent on unstashing the first set of files that are already present in the first workspace on the first node. In some implementations, the controller may thus return (e.g., to the user device or to the script executor) a completion indicator without performing the unstash operation.

Additionally, or alternatively, as shown by reference number 135, the controller may check the global stash variable to determine whether to perform an unstash operation. For example, based on the global stash variable including an indicator associated with the first set of files, the controller may perform the unstash operation (e.g., on the pipeline engine), as shown by reference number 140. The controller may perform the unstash operation in response to the unstash command (e.g., from the user device or the script executor). Performing the unstash operation may result in the first set of files being stored in the first workspace on the first node. When both the first stash variable and the global stash variable lack the first stash indicator, the controller may return an error message because the pipeline engine lacks a stash corresponding to the unstash command.

In some implementations, the controller may perform the determinations sequentially. For example, the controller may check the global stash variable based on the first stash variable lacking an indicator associated with the second set of files. Alternatively, the controller may perform the determinations jointly (e.g., using a compound Boolean expression in an if-then statement or using a switch command, among other examples).

The operations described in connection with FIG. 1B may be repeated. For example, the controller may receive an additional unstash command, associated with a second node and a second workspace, to unstash a second set of files. Accordingly, the controller may check the global stash variable and a second stash variable (e.g., associated with the second node) to determine whether to perform an unstash operation.

Figure 1C:
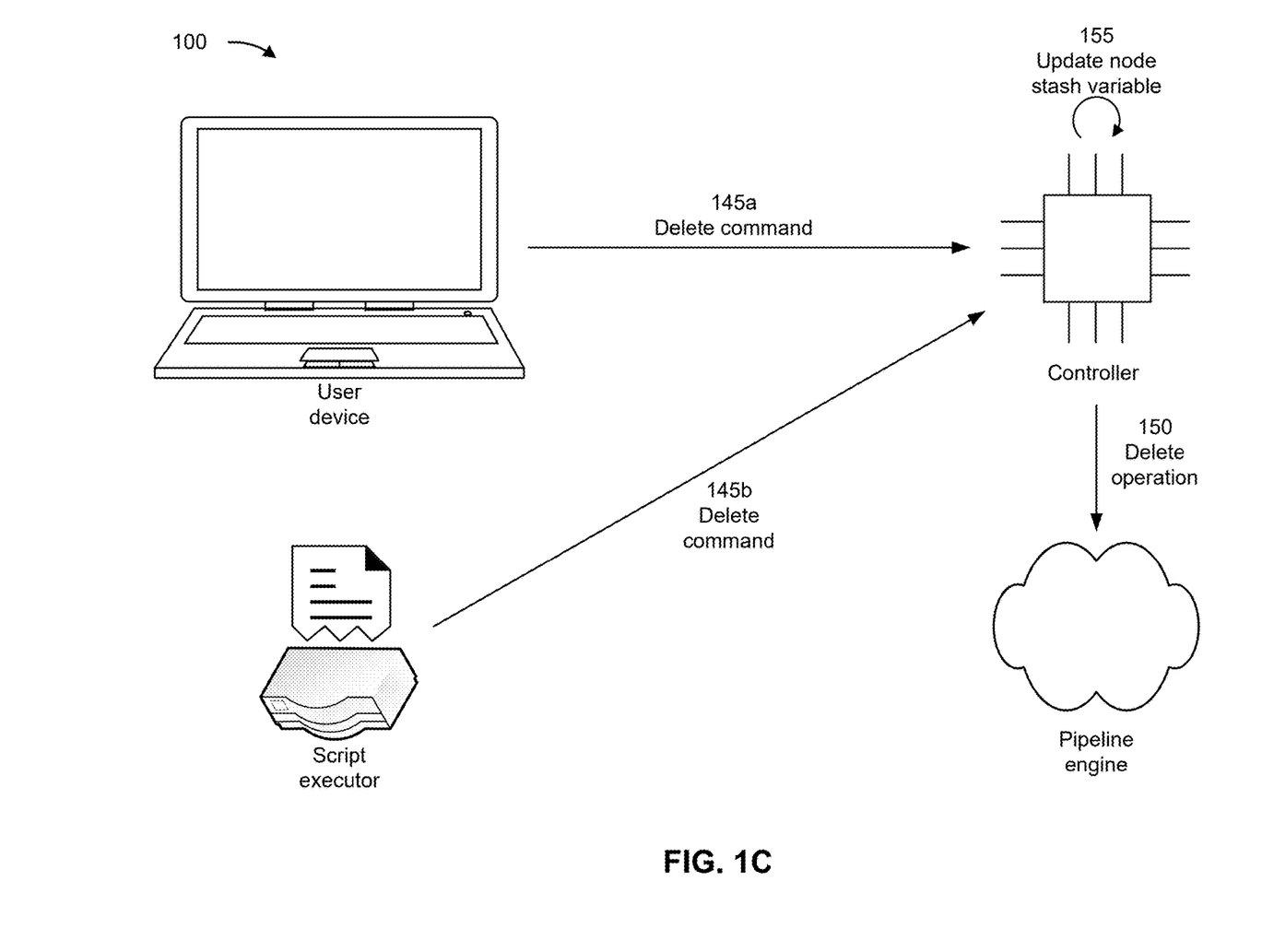

As shown in FIG. 1C, the controller may also update the stash variables in response to delete commands. As shown by reference number 145*a*, the user device may transmit, and the controller may receive, a delete command. The user device may transmit the command by transmitting an HTTP request and/or by performing a call to an API function, among other examples. In some implementations, a user of the user device may provide input (e.g., using an input component of the user device) that triggers the user device to transmit the command. In another example, as shown by reference number 145*b*, the script executor may transmit, and the controller may receive, the delete command. The script executor may perform operations according to a script (e.g., a set of BASH instructions, a set of Python instructions, and/or another set of sequential instructions) and may transmit the delete command based on a current instruction in the script.

The delete command may be associated with the first node and/or the first workspace. For example, the delete command may indicate the first node and/or the first workspace (e.g., in parameters encoded in a header and/or a body of the request and/or as arguments to an API call).

As shown by reference number 150, the controller may perform a delete operation (e.g., on the pipeline engine). The controller may perform the delete operation in response to the delete command (e.g., from the user device or the script executor). Performing the delete operation may remove all files from the first workspace (e.g., based on the delete command indicating the first workspace). Alternatively, performing the delete operation may remove all files from the first node (e.g., based on the delete command indicating the first node).

The controller may update the first stash variable, associated with the first node, as shown by reference number 155. In some implementations, the controller may remove all indicators, associated with the first workspace, from the first stash variable (e.g., based on the delete operation being associated with the first workspace). Alternatively, the controller may remove all indicators from the first stash variable (e.g., based on the delete operation being associated with the first node).

The operations described in connection with FIG. 1C may be repeated. For example, the controller may receive an additional delete command associated with a second node and/or a second workspace. Accordingly, the controller may perform a delete operation on the second workspace and/or the second node in response to the additional delete command. The controller may update a second stash variable, associated with the second node, to remove all indicators (or at least all indicators associated with the second workspace).

Figure 1D:
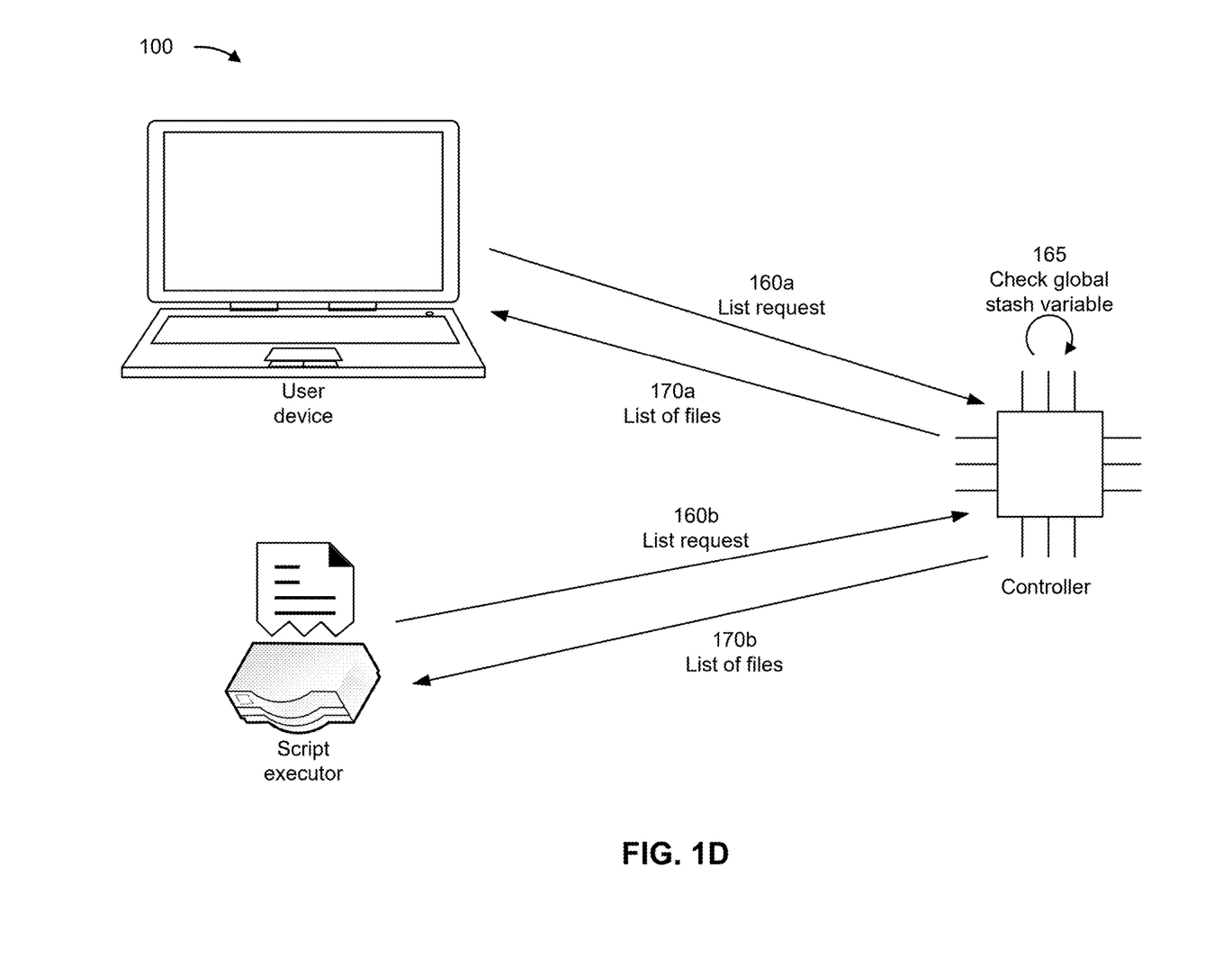

As shown in FIG. 1D, the controller may provide lists of stashed files using the stash variables. As shown by reference number 160*a*, the user device may transmit, and the controller may receive, a request for a list of the first set of files. The user device may transmit the request by transmitting an HTTP request and/or by performing a call to an API function, among other examples. In some implementations, a user of the user device may provide input (e.g., using an input component of the user device) that triggers the user device to transmit the request. In another example, as shown by reference number 160*b*, the script executor may transmit, and the controller may receive, the request for the list of the first set of files. The script executor may perform operations according to a script (e.g., a set of BASH instructions, a set of Python instructions, and/or another set of sequential instructions) and may transmit the request based on a current instruction in the script.

As shown by reference number 165, the controller may check the global stash variable to determine the list of the first set of files. For example, the controller may map the request to a stash indicated in the global stash variable (e.g., by mapping a name and/or another indicator of the stash in the request to a corresponding indicator in the global stash variable). Accordingly, the controller may extract the list of the first set of files from the global stash variable.

The controller may return the list. For example, as shown by reference number 170*a*, the controller may transmit, and the user device may receive, the list of the first set of files. The user device may output the list to a user of the user device (e.g., via an output component of the user device). In another example, as shown by reference number 170*b*, the controller may transmit, and the script executor may receive, the list of the first set of files. The script executor may cache the list (e.g., for use in a later instruction).

The operations described in connection with FIG. 1D may be repeated. For example, the controller may receive a request for a list of a second set of files. Accordingly, the controller may check the global stash variable to return the list of the second set of files.

Figure 1E:
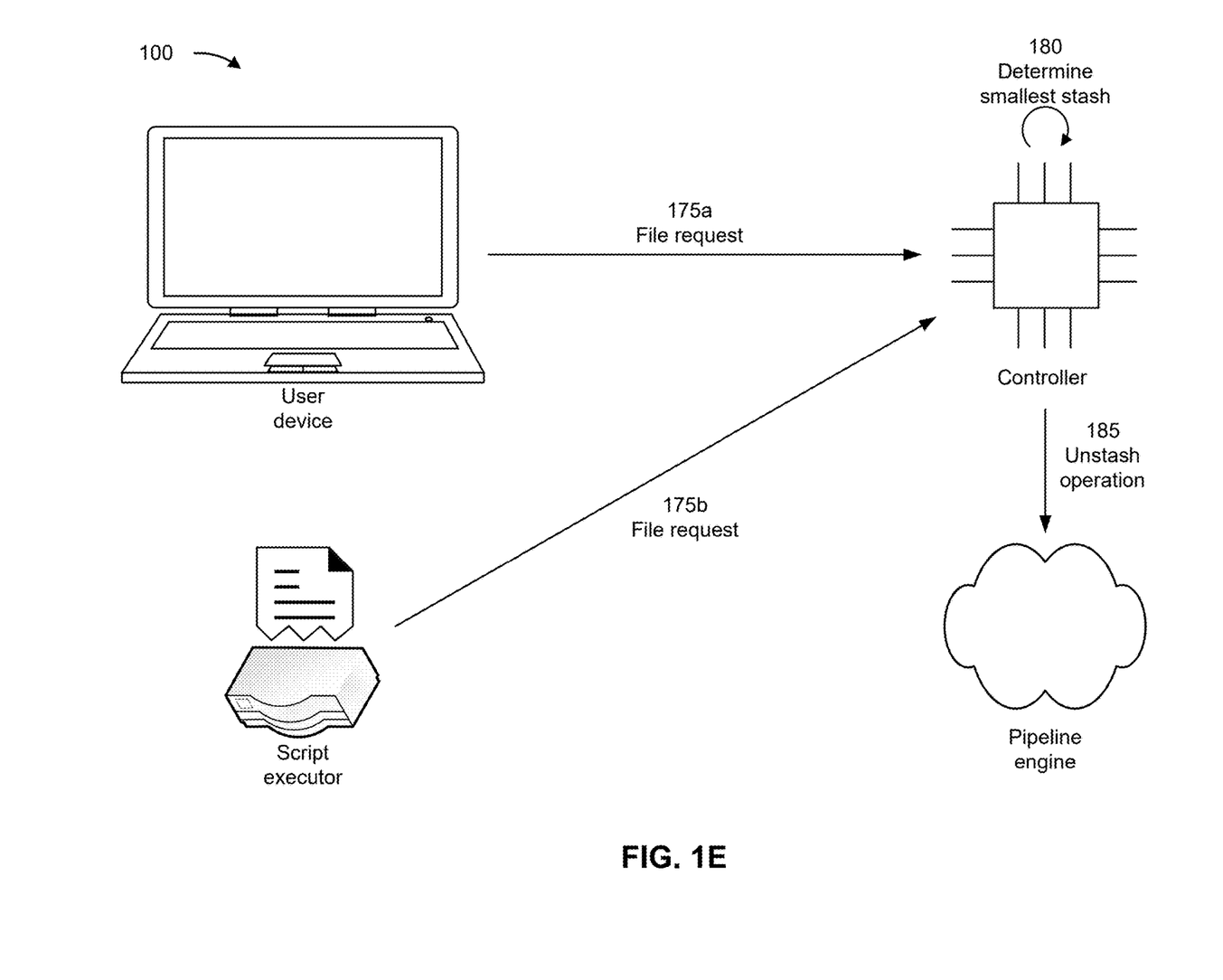

As shown in FIG. 1E, the controller may use the stash variables to speed up unstash operations that indicate particular files. As shown by reference number 175*a*, the user device may transmit, and the controller may receive, a request for a particular file. The user device may transmit the request by transmitting an HTTP request and/or by performing a call to an API function, among other examples. In some implementations, a user of the user device may provide input (e.g., using an input component of the user device) that triggers the user device to transmit the request. In another example, as shown by reference number 175b, the script executor may transmit, and the controller may receive, the request for the particular file. The script executor may perform operations according to a script (e.g., a set of BASH instructions, a set of Python instructions, and/or another set of sequential instructions) and may transmit the request based on a current instruction in the script.

As shown by reference number 180, the controller may check the global stash variable (and optionally the first stash variable) to determine a smallest stash that includes the particular file. For example, the controller may map an indication of the particular file in the request to a filename (and/or file path) indicated in the global stash variable. Accordingly, the controller may suggest a stash, indicated in the global stash variable, that includes the particular file and has a smallest size relative to other stashes that also include the particular file. Additionally, in some implementations, the request may be associated with the first node, and the controller may suggest a stash, also indicated in the first stash variable, that includes the particular file and has a smallest size relative to other stashes on the first node that also include the particular file.

Accordingly, as shown by reference number 185, the controller may perform an unstash operation (e.g., on the pipeline engine). The controller may perform the unstash operation in response to the request for the particular file (e.g., from the user device or the script executor). Because the controller selected a smallest stash with the particular file, the controller conserves power and processing resources relative to performing an unstash operation on larger stashes that include the particular file. Therefore, the particular file is unstashed onto the first node.

The operations described in connection with FIG. 1E may be repeated. For example, the controller may receive a request for an additional particular file. Accordingly, the controller may check the global stash variable (and optionally a first stash variable) to determine a smallest stash that includes the additional particular file. Therefore, the controller may perform an unstash operation (e.g., on the pipeline engine). Therefore, the additional particular file is unstashed onto a second node.

By using techniques as described in connection with FIGS. 1A-1E, the controller tracks stashed files. Therefore, the controller may use the stash variables to verify whether unstash commands are associated with files that are already present on a relevant node and/or workspace. As a result, processing resources and power are conserved that otherwise would have been wasted on executing redundant unstash commands.

As indicated above, FIGS. 1A-1E are provided as an example. Other examples may differ from what is described with regard to FIGS. 1A-1E.

Figure 2:
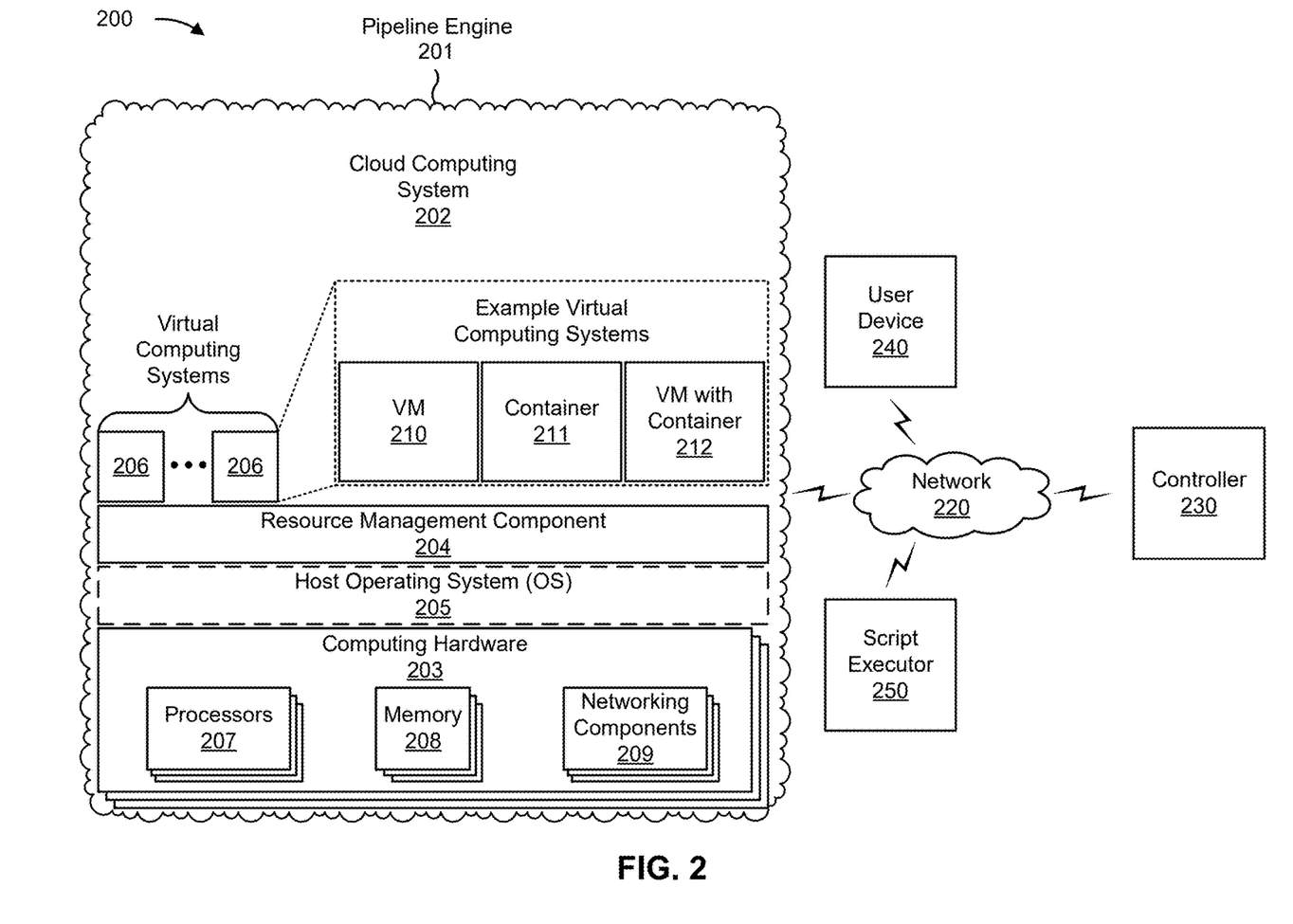
FIG. 2 is a diagram of an example environment in which systems and/or methods described herein may be implemented, in accordance with some embodiments of the present disclosure.

FIG. 2 is a diagram of an example environment 200 in which systems and/or methods described herein may be implemented. As shown in FIG. 2, environment 200 may include a pipeline engine 201, which may include one or more elements of and/or may execute within a cloud computing system 202. The cloud computing system 202 may include one or more elements 203-212, as described in more detail below. As further shown in FIG. 2, environment 200 may include a network 220, a controller 230, a user device 240, and/or a script executor 250. Devices and/or elements of environment 200 may interconnect via wired connections and/or wireless connections.

The cloud computing system 202 may include computing hardware 203, a resource management component 204, a host operating system (OS) 205, and/or one or more virtual computing systems 206. The cloud computing system 202 may execute on, for example, an Amazon Web Services platform, a Microsoft Azure platform, or a Snowflake platform. The resource management component 204 may perform virtualization (e.g., abstraction) of computing hardware 203 to create the one or more virtual computing systems 206. Using virtualization, the resource management component 204 enables a single computing device (e.g., a computer or a server) to operate like multiple computing devices, such as by creating multiple isolated virtual computing systems 206 from computing hardware 203 of the single computing device. In this way, computing hardware 203 can operate more efficiently, with lower power consumption, higher reliability, higher availability, higher utilization, greater flexibility, and lower cost than using separate computing devices.

The computing hardware 203 may include hardware and corresponding resources from one or more computing devices. For example, computing hardware 203 may include hardware from a single computing device (e.g., a single server) or from multiple computing devices (e.g., multiple servers), such as multiple computing devices in one or more data centers. As shown, computing hardware 203 may include one or more processors 207, one or more memories 208, and/or one or more networking components 209. Examples of a processor, a memory, and a networking component (e.g., a communication component) are described elsewhere herein.

The resource management component 204 may include a virtualization application (e.g., executing on hardware, such as computing hardware 203) capable of virtualizing computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, or another type of hypervisor) or a virtual machine monitor, such as when the virtual computing systems 206 are virtual machines 210. Additionally, or alternatively, the resource management component 204 may include a container manager, such as when the virtual computing systems 206 are containers 211. In some implementations, the resource management component 204 executes within and/or in coordination with a host operating system 205.

A virtual computing system 206 may include a virtual environment that enables cloud-based execution of operations and/or processes described herein using computing hardware 203. As shown, a virtual computing system 206 may include a virtual machine 210, a container 211, or a hybrid environment 212 that includes a virtual machine and a container, among other examples. A virtual computing system 206 may execute one or more applications using a file system that includes binary files, software libraries, and/or other resources required to execute applications on a guest operating system (e.g., within the virtual computing system 206) or the host operating system 205.

Although the pipeline engine 201 may include one or more elements 203-212 of the cloud computing system 202, may execute within the cloud computing system 202, and/or may be hosted within the cloud computing system 202, in some implementations, the pipeline engine 201 may not be cloud-based (e.g., may be implemented outside of a cloud computing system) or may be partially cloud-based. For example, the pipeline engine 201 may include one or more devices that are not part of the cloud computing system 202, such as device 300 of FIG. 3, which may include a stand-alone server or another type of computing device. The pipeline engine 201 may perform one or more operations and/or processes described in more detail elsewhere herein.

The network 220 may include one or more wired and/or wireless networks. For example, the network 220 may include a cellular network, a public land mobile network (PLMN), a local area network (LAN), a wide area network (WAN), a private network, the Internet, and/or a combination of these or other types of networks. The network 220 enables communication among the devices of the environment 200.

The controller 230 may include one or more devices capable of receiving, generating, storing, processing, providing, and/or routing information associated with commands for the pipeline engine 201, as described elsewhere herein. The controller 230 may include a communication device and/or a computing device. For example, the controller 230 may include a server, such as an application server, a client server, a web server, a database server, a host server, a proxy server, a virtual server (e.g., executing on computing hardware), or a server in a cloud computing system. In some implementations, the controller 230 may include computing hardware used in a cloud computing environment.

The user device 240 may include one or more devices capable of receiving, generating, storing, processing, and/or providing information associated with commands for the pipeline engine 201, as described elsewhere herein. The user device 240 may include a communication device and/or a computing device. For example, the user device 240 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The script executor 250 may include one or more devices capable of receiving, generating, storing, processing, and/or providing information associated with scripts, as described elsewhere herein. The script executor 250 may include a communication device and/or a computing device. For example, the script executor 250 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device. In another example, the script executor 250 may include a server, such as an application server, a client server, a web server, a database server, a host server, a proxy server, a virtual server (e.g., executing on computing hardware), or a server in a cloud computing system. In some implementations, the script executor 250 may include computing hardware used in a cloud computing environment.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
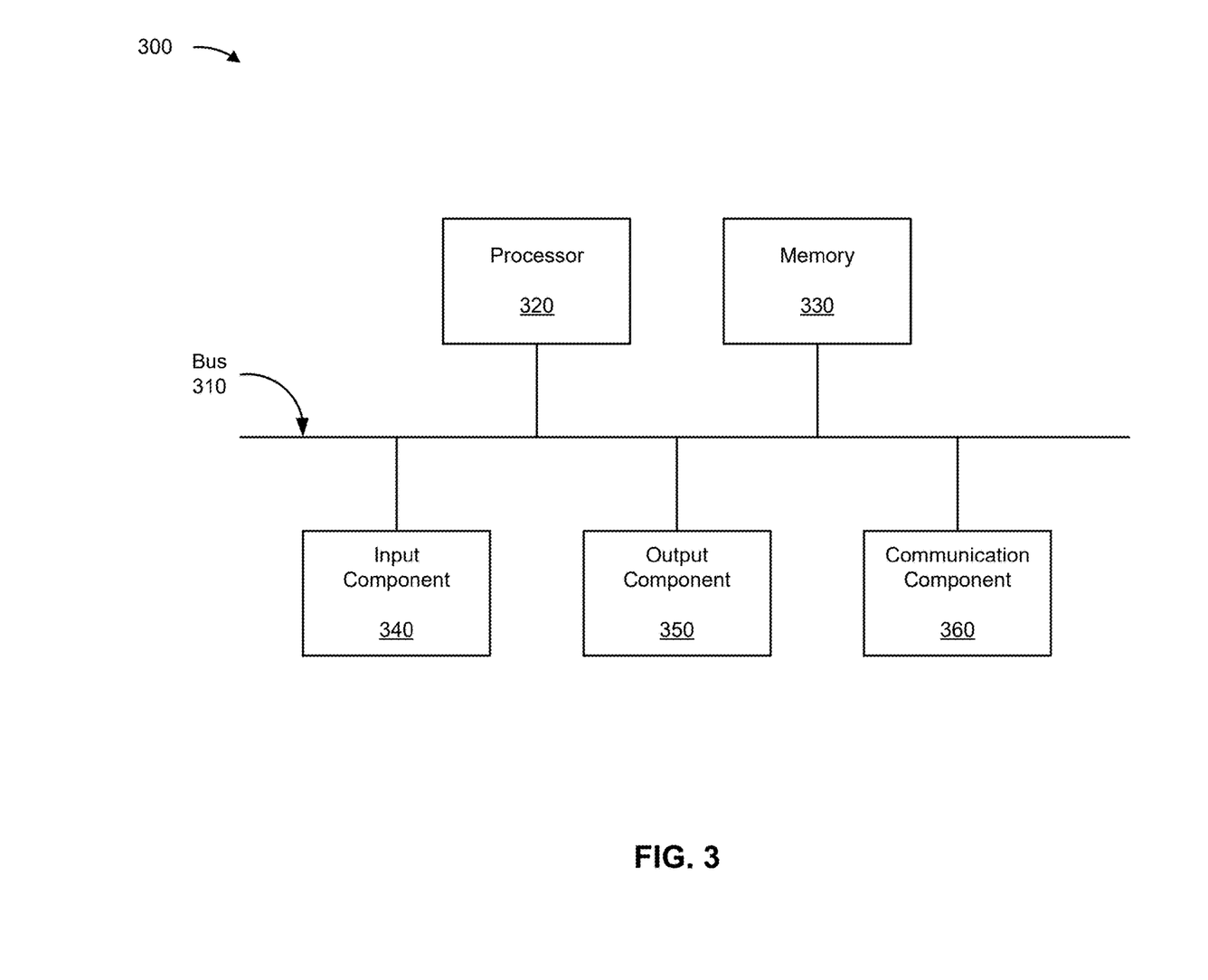
FIG. 3 is a diagram of example components of one or more devices of FIG. 2, in accordance with some embodiments of the present disclosure.

FIG. 3 is a diagram of example components of a device 300 associated with intelligent file stashing and unstashing. The device 300 may correspond to a controller 230, a user device 240, and/or a script executor 250. In some implementations, a controller 230, a user device 240, and/or a script executor 250 may include one or more devices 300 and/or one or more components of the device 300. As shown in FIG. 3, the device 300 may include a bus 310, a processor 320, a memory 330, an input component 340, an output component 350, and/or a communication component 360.

The bus 310 may include one or more components that enable wired and/or wireless communication among the components of the device 300. The bus 310 may couple together two or more components of FIG. 3, such as via operative coupling, communicative coupling, electronic coupling, and/or electric coupling. For example, the bus 310 may include an electrical connection (e.g., a wire, a trace, and/or a lead) and/or a wireless bus. The processor 320 may include a central processing unit, a graphics processing unit, a microprocessor, a controller, a microcontroller, a digital signal processor, a field-programmable gate array, an application-specific integrated circuit, and/or another type of processing component. The processor 320 may be implemented in hardware, firmware, or a combination of hardware and software. In some implementations, the processor 320 may include one or more processors capable of being programmed to perform one or more operations or processes described elsewhere herein.

The memory 330 may include volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 may store information, one or more instructions, and/or software (e.g., one or more software applications) related to the operation of the device 300. In some implementations, the memory 330 may include one or more memories that are coupled (e.g., communicatively coupled) to one or more processors (e.g., processor 320), such as via the bus 310. Communicative coupling between a processor 320 and a memory 330 may enable the processor 320 to read and/or process information stored in the memory 330 and/or to store information in the memory 330.

The input component 340 may enable the device 300 to receive input, such as user input and/or sensed input. For example, the input component 340 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 350 may enable the device 300 to provide output, such as via a display, a speaker, and/or a light-emitting diode. The communication component 360 may enable the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
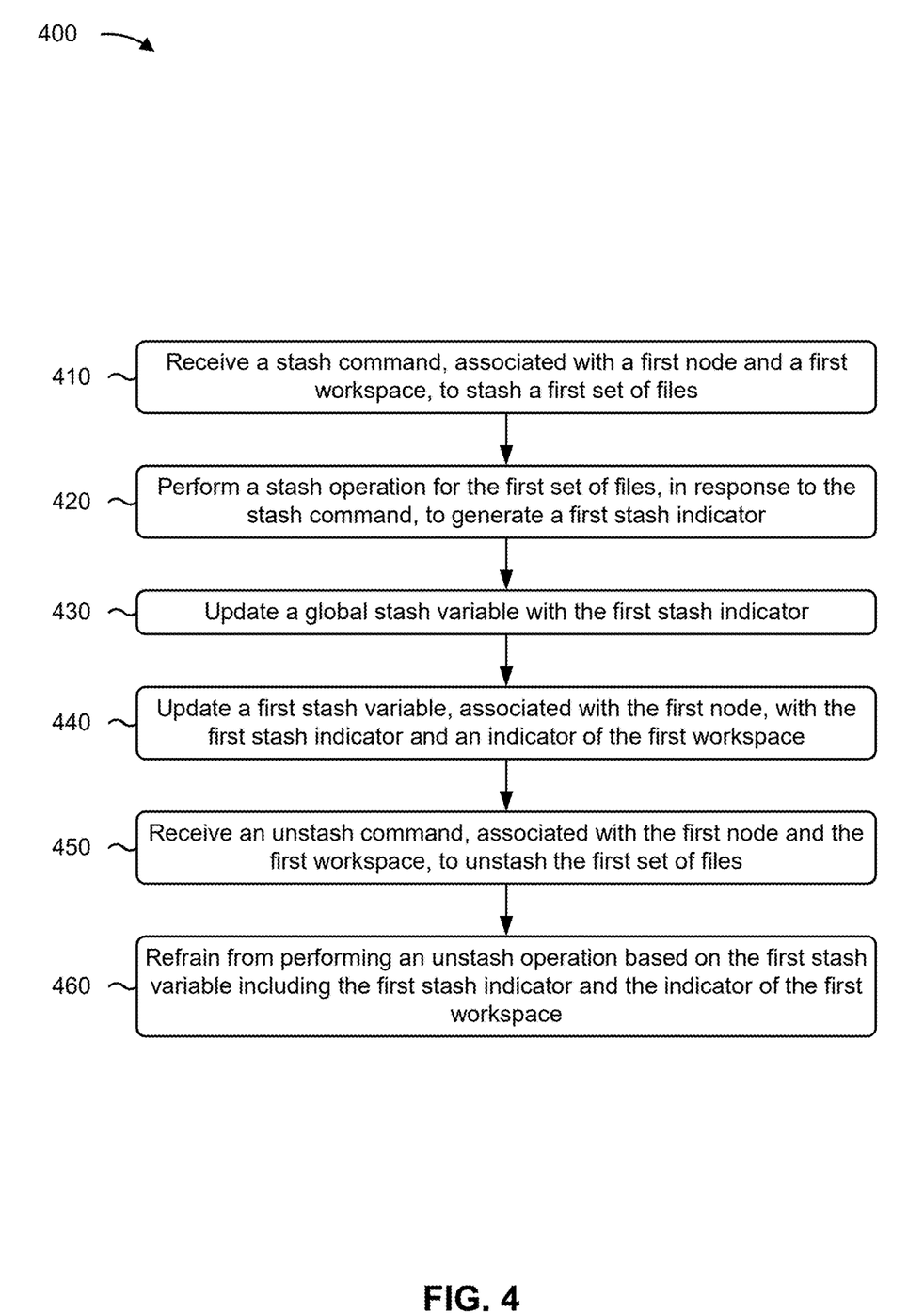
FIG. 4 is a flowchart of an example process relating to intelligent file stashing and unstashing, in accordance with some embodiments of the present disclosure.

FIG. 4 is a flowchart of an example process 400 associated with intelligent file stashing and unstashing. In some implementations, one or more process blocks of FIG. 4 may be performed by a controller 230. In some implementations, one or more process blocks of FIG. 4 may be performed by another device or a group of devices separate from or including the controller 230, such as a pipeline engine 201, a user device 240, and/or a script executor 250. Additionally, or alternatively, one or more process blocks of FIG. 4 may be performed by one or more components of the device 300, such as processor 320, memory 330, input component 340, output component 350, and/or communication component 360.

As shown in FIG. 4, process 400 may include receiving a stash command, associated with a first node and a first workspace, to stash a first set of files (block 410). For example, the controller 230 (e.g., using processor 320, memory 330, input component 340, and/or communication component 360) may receive a stash command, associated with a first node and a first workspace, to stash a first set of files, as described above in connection with reference number 105a or reference number 105b of FIG. 1A. As an example, a user device may transmit, and the controller 230 may receive, the stash command. The user device may transmit the stash command by transmitting an HTTP request and/or by performing a call to an API function, among other examples. Additionally, or alternatively, a script executor may transmit, and the controller 230 may receive, the stash command. The script executor may perform operations according to a script (e.g., a set of BASH instructions, a set of Python instructions, and/or another set of sequential instructions) and may transmit the stash command based on a current instruction in the script.

As further shown in FIG. 4, process 400 may include performing a stash operation for the first set of files, in response to the stash command, to generate a first stash indicator (block 420). For example, the controller 230 (e.g., using processor 320 and/or memory 330) may perform a stash operation for the first set of files, in response to the stash command, to generate a first stash indicator, as described above in connection with reference number 110 of FIG. 1A. As an example, the controller 230 may perform the stash operation in response to the stash command (e.g., from the user device or the script executor). Performing the stash operation may result in the first stash indicator. For example, the first stash indicator may be an alphanumeric identifier associated with a stash that includes the first set of files.

As further shown in FIG. 4, process 400 may include updating a global stash variable with the first stash indicator (block 430). For example, the controller 230 (e.g., using processor 320 and/or memory 330) may update a global stash variable with the first stash indicator, as described above in connection with reference number 115 of FIG. 1A. As an example, the controller 230 may append, to the global stash variable, an object having a name corresponding to the first stash indicator. Therefore, the object may represent the first set of files. The controller 230 may further store a list of the first set of files in the object. Therefore, the object may encode a list of the first set of files. In some implementations, the controller 230 may further store at least one property, associated with the first set of files, in the object.

As further shown in FIG. 4, process 400 may include updating a first stash variable, associated with the first node, with the first stash indicator and an indicator of the first workspace (block 440). For example, the controller 230 (e.g., using processor 320 and/or memory 330) may update a first stash variable, associated with the first node, with the first stash indicator and an indicator of the first workspace, as described above in connection with reference number 120 of FIG. 1A. As an example, the controller 230 may store a name, corresponding to the first stash indicator, in an object representing the first node. Additionally, the controller 230 may store a name of the first workspace in the object representing the first node.

As further shown in FIG. 4, process 400 may include receiving an unstash command, associated with the first node and the first workspace, to unstash the first set of files (block 450). For example, the controller 230 (e.g., using processor 320, memory 330, input component 340, and/or communication component 360) may receive an unstash command, associated with the first node and the first workspace, to unstash the first set of files, as described above in connection with reference number 125a or reference number 125b of FIG. 1B. As an example, the user device may transmit, and the controller 230 may receive, the unstash command. Additionally, or alternatively, the script executor may transmit, and the controller 230 may receive, the unstash command.

As further shown in FIG. 4, process 400 may include refraining from performing an unstash operation based on the first stash variable including the first stash indicator and the indicator of the first workspace (block 460). For example, the controller 230 (e.g., using processor 320 and/or memory 330) may refrain from performing an unstash operation based on the first stash variable including the first stash indicator and the indicator of the first workspace, as described above in connection with FIG. 1B. As an example, the controller 230 may conserve power and processing resources that otherwise would have been spent on unstashing the first set of files that are already present in the first workspace on the first node. In some implementations, the controller may thus return (e.g., to the user device or to the script executor) a completion indicator without performing the unstash operation.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel. The process 400 is an example of one process that may be performed by one or more devices described herein. These one or more devices may perform one or more other processes based on operations described herein, such as the operations described in connection with FIGS. 1A-1E. Moreover, while the process 400 has been described in relation to the devices and components of the preceding figures, the process 400 can be performed using alternative, additional, or fewer devices and/or components. Thus, the process 400 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for intelligent file stashing and unstashing, the system comprising:
    one or more memories; and
    one or more processors, communicatively coupled to the one or more memories, configured to:
        receive a stash command, associated with a first node and a first workspace, to stash a first set of files;
        perform a stash operation for the first set of files, in response to the stash command, to generate a first stash indicator;
        update a global stash variable with the first stash indicator;
        update a first stash variable, associated with the first node, with the first stash indicator and an indicator of the first workspace;
        receive an unstash command, associated with the first node and the first workspace, to unstash the first set of files; and
        refrain from performing an unstash operation based on the first stash variable including the first stash indicator and the indicator of the first workspace.

2. The system of claim 1, wherein the one or more processors are configured to:
    receive an additional stash command, associated with a second node and a second workspace, to stash a second set of files;
    perform a stash operation for the second set of files, in response to the additional stash command, to generate a second stash indicator;
    update the global stash variable with the second stash indicator; and
    update a second stash variable, associated with the second node, with the second stash indicator and an indicator of the second workspace.

3. The system of claim 1, wherein the one or more processors, to update the global stash variable, are configured to:
append an object having a name corresponding to the first stash indicator; and
store a list of the first set of files in the object.

4. The system of claim 3, wherein the one or more processors are configured to:
store at least one property, associated with the first set of files, in the object.

5. The system of claim 1, wherein the one or more processors, to update the first stash variable, are configured to:
store a name of the first workspace in an object representing the first node; and
store a name, corresponding to the first stash indicator, in the object representing the first node.

6. The system of claim 1, wherein the one or more processors are configured to:
receive an additional unstash command, associated with a second node and a second workspace, to unstash a second set of files; and
perform an unstash operation for the second set of files, in response to the additional unstash command, based on a second stash variable lacking an indicator associated with the second set of files and the global stash variable including the indicator associated with the second set of files.

7. The system of claim 1, wherein the one or more processors are configured to:
receive a delete command associated with the first workspace and the first node;
perform a delete operation on the first workspace in response to the delete command; and
update the first stash variable, associated with the first node, to remove all indicators associated with the first workspace.

8. The system of claim 1, wherein the one or more processors are configured to:
receive a delete command associated with the first node;
perform a delete operation for the first node in response to the delete command; and
update the first stash variable, associated with the first node, to remove all indicators.

9. A method of intelligent file unstashing, comprising:
receiving, at a controller, a first unstash command, associated with a first node and a first workspace, to unstash a first set of files;
performing, by the controller, an unstash operation for the first set of files, in response to the first unstash command, based on a first stash variable lacking an indicator associated with the first set of files and a global stash variable including the indicator associated with the first set of files;
receiving, at the controller, a second unstash command, associated with a second node and a second workspace, to unstash a second set of files; and
refraining from performing, by the controller, an unstash operation based on a second stash variable including an indicator associated with the second set of files.

10. The method of claim 9, wherein the global stash variable is associated with a pipeline including the first node and the second node.

11. The method of claim 9, wherein the first node includes a first set of workspaces including the first workspace, and the second node includes a second set of workspaces including the second workspace.

12. The method of claim 9, wherein refraining from performing the unstash operation comprises:
returning a completion indicator without performing the unstash operation.

13. The method of claim 9, further comprising:
receiving a request for a list of the first set of files; and
returning the list based on the first stash variable.

14. The method of claim 9, further comprising:
receiving a delete command associated with the first workspace and the first node;
performing a delete operation on the first workspace in response to the delete command; and
updating the first stash variable, associated with the first node, to remove all indicators associated with the first workspace.

15. A non-transitory computer-readable medium storing a set of instructions for intelligent file stashing, the set of instructions comprising:
one or more instructions that, when executed by one or more processors of a device, cause the device to:
receive a first stash command, associated with a first node and a first workspace, to stash a first set of files;
perform a stash operation for the first set of files, in response to the first stash command, to generate a first stash indicator;
update a global stash variable with the first stash indicator;
update a first stash variable, associated with the first node, with the first stash indicator and an indicator of the first workspace;
receive a second stash command, associated with a second node and a second workspace, to stash a second set of files;
perform a stash operation for the second set of files, in response to the second stash command, to generate a second stash indicator;
update the global stash variable with the second stash indicator; and
update a second stash variable, associated with the second node, with the second stash indicator and an indicator of the second workspace.

16. The non-transitory computer-readable medium of claim 15, wherein the one or more instructions, when executed by the one or more processors, further cause the device to:
receive a request for a list of the second set of files; and
return the list based on the second stash variable.

17. The non-transitory computer-readable medium of claim 15, wherein the one or more instructions, when executed by the one or more processors, further cause the device to:
receive a delete command associated with the second workspace and the second node;
perform a delete operation on the second workspace in response to the delete command; and
update the second stash variable, associated with the second node, to remove all indicators associated with the second workspace.

18. The non-transitory computer-readable medium of claim 15, wherein the global stash variable includes a first object, that represents the first set of files and that encodes a list of the first set of files, and a second object that represents the second set of files and that encodes a list of the second set of files.

19. The non-transitory computer-readable medium of claim 15, wherein the first stash variable includes a name of the first workspace and a name corresponding to the first stash indicator.

20. The non-transitory computer-readable medium of claim 15, wherein the second stash variable includes a name of the second workspace and a name corresponding to the second stash indicator.

\* \* \* \* \*